UNITED STATES PATENT OFFICE 2,499,009

CHLOROSILANES

George H. Wagner, Kenmore, N. Y., assignor to The Linde Air Products Company, a corporation of Ohio No Drawing. Application February 15, 1947, Serial No. 728,943

6 Claims. (Cl. 23—14)

It is well known that chlorine-containing silicon compounds can be formed by subjecting silicon at an elevated temperature to the action of chlorine or chlorine compounds, for example, alkyl or aryl chlorides or hydrogen chloride. A number of metals are known to catalyze such reactions to some extent, for example, nickel, tin, silver, copper, antimony, manganese and titanium. Compositions containing silicon and a catalytic metal have been prepared in many ways and proportions, as by alloyage or by mixing the powdered materials. Copper and other catalytic metals have been deposited on silicon by the reaction $$4MCl + Si = SiCl_4 + 4M$$

where M is the catalytic metal. The resulting compositions have been subjected to various conditioning treatments, such as grinding, sintering, etc.

No catalyst-containing mix has been found which is entirely satisfactory for all such reactions involving silicon and chlorine. On the contrary the compositions, frequently called "masses," are more or less specific in action, one which is preferable under one set of conditions being inferior under other conditions. Moreover, the behavior of the silicon-catalyst combination does not depend merely on chemical constitution as shown by analysis but on factors such as physical condition, traces of adsorbed gases and the like, most of which are not well understood.

The present invention relates to the preparation of chlorosilanes by the action of hydrogen chloride on silicon, and an object is to improve the efficiency of such processes. A more special object is to provide a process of this kind giving a substantial yield of dichlorosilane, $SiH_2Cl_2$, which is particularly useful in synthesizing organo-silicon compounds.

Copper has long been recognized as an excellent catalyst for preparing $SiHCl_3$ and $SiCl_4$. However, it appears from the reports in the literature that such copper-catalyzed masses as have been used in this connection give low yields of dichlorosilane, or no detectable quantity.

I have discovered that a superior mass for the preparation of the chlorosilanes can be made by mixing a copper halide, such as cuprous or cupric chloride or bromide, with powdered silicon, and heating the mixture to reduce the halide and volatilize an equivalent quantity of silicon halide. A greatly improved reaction mixture can be obtained by holding the product of the foregoing steps for a time at an elevated temperature. The following example is illustrative:

Silicon ground to pass a 65 mesh screen (1350 grams) was intimately mixed with 234 g. of CuCl, and the mixture was dried in a slow stream of hydrogen for about one hour at 100°–150° C. The temperature was then raised to 300°–450° C. and held overnight in that range, with the hydrogen stream continuing. Finally, the mixture was heated in air at 1000° C. for one hour. Slight sintering occurred, and the mass, which contained about 10% Cu, was cooled and ground to pass a 65 mesh screen.

The silicon-copper mass thus prepared was held at 250° C. while a mixture of hydrogen and hydrogen chloride was passed over it at the rate of 2 cubic feet (ca. 86 g.) of HCl and 4 cubic feet of $H_2$ per hour. The volatile silicon compounds formed were condensed and fractionally distilled. The proportions found were:

| | Per cent |
|---|---|
| $SiH_2Cl_2$ | 19.7 |
| $SiHCl_3$ | 80.0 |

In comparative tests using silicon with a tin catalyst, with a nickel catalyst, and with no catalyst, the proportion of $SiH_2Cl_2$ in the product did not exceed 0.5% in any instance. A mass containing 25% Cu, made by sintering powdered copper with powdered silicon, gave 2.1% $SiH_2Cl_2$ in the product, while an alloy containing 70% Cu with 30% Si gave only 5.8%.

The proportion of copper in masses prepared in accordance with my invention is not critical. In a series of comparative tests the proportion of $SiH_2Cl_2$ in the product did not fall below 10% when the copper content was varied from 1% to 50%.

In the specific example cited above, the mass was activated at 1000° C. Temperatures as low as 600° C. can be used, but in general longer times are required at lower temperatures. Since no difficulty is involved in using a temperature and a time which will insure thorough activation, I prefer at least one hour at a temperature of at least 1000° C.

Chlorosilanes, including good yields of $SiH_2Cl_2$, can be prepared from the hereindescribed masses over a considerable range of temperatures, the range from 200° C. to 300° C. being preferred. Many of the tests cited herein were conducted at 250° C.

Excellent masses can be prepared by making a composition rich in copper by the hereindescribed methods, and then intimately mixing it, as by grinding, with an additional quantity of silicon. Also, when a mass has been partially depleted in silicon by reaction with hydrogen chloride, it can be restored to approximately its initial activity by adding silicon. In such a case the thermal activating treatment is preferably applied to the mixture.

While the foregoing description refers to the use of "silicon" in making the catalyzed masses, it will be understood that this term embraces all silicon-containing compositions and alloys which are sufficiently free from interfering impurities.

What is claimed is:

1. A process for the production of chlorosilanes comprising the steps of heating a copper halide with silicon so as to reduce the halide and form a silicon-copper mixture, reacting said mixture with hydrogen chloride, and recovering a chlorosilane.

2. A process for the production of chlorosilanes comprising the steps of heating a copper chloride with silicon in a non-oxidizing atmosphere so as to reduce the chloride and form a silicon-copper mixture, reacting said mixture with hydrogen chloride, and recovering a chlorosilane.

3. A process for the production of chlorosilanes comprising the steps of heating cuprous chloride with silicon in a non-oxidizing atmosphere so as to reduce the chloride and form a silicon-copper mixture, heating said mixture for at least one hour at a temperature of at least 600° C., reacting said mixture with hydrogen chloride, and recovering a chlorosilane.

4. A process for the production of chlorosilanes comprising the steps of heating a copper chloride with silicon in a non-oxidizing atmosphere so as to reduce the chloride and form a silicon-copper mixture, heating said mixture for at least one hour at a temperature of at least 600° C., reacting said mixture with hydrogen chloride at a temperature of 200°–300° C., and recovering a chlorosilane.

5. A process for the production of chlorosilanes comprising the steps of heating a copper halide with silicon in a non-oxidizing atmosphere so as to reduce the halide and form a silicon-copper mixture, heating said mixture in a nonoxidizing atmosphere for at least one hour at a temperature of at least 1000° C., reacting said mixture with hydrogen chloride at a temperature of 200°–300° C., and recovering a chlorosilane.

6. A process for the production of chlorosilanes comprising the steps of heating cuprous chloride with silicon in a hydrogen-containing atmosphere so as to reduce the chloride and form a silicon-copper mixture, heating said mixture for at least one hour at a temperature of at least 1000° C., reacting said mixture with hydrogen chloride in the presence of an additional non-oxidizing gas at a temperature of 200–300° C., and recovering a chlorosilane.

GEORGE H. WAGNER.

No references cited.